US011314466B2

(12) United States Patent
Tanaka

(10) Patent No.: US 11,314,466 B2
(45) Date of Patent: Apr. 26, 2022

(54) INFORMATION PROCESSING APPARATUS, IMAGE FORMING SYSTEM, PRINT CONTROL METHOD, AND RECORDING MEDIUM

(71) Applicant: KONICA MINOLTA, INC., Tokyo (JP)

(72) Inventor: Ryohei Tanaka, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/907,435

(22) Filed: Jun. 22, 2020

(65) Prior Publication Data
US 2020/0401356 A1 Dec. 24, 2020

(30) Foreign Application Priority Data
Jun. 24, 2019 (JP) .............................. JP2019-116059

(51) Int. Cl.
*G06F 3/12* (2006.01)
*G06K 15/02* (2006.01)

(52) U.S. Cl.
CPC .......... *G06F 3/1215* (2013.01); *G06F 3/1206* (2013.01); *G06F 3/1248* (2013.01); *G06K 15/1836* (2013.01); *G06K 15/1865* (2013.01)

(58) Field of Classification Search
CPC ................................................... G06F 3/1215
USPC ....................................................... 358/1.13
See application file for complete search history.

(56) References Cited

U.S. PATENT DOCUMENTS

| 6,348,969 B1* | 2/2002 | Ikeda | G06K 15/12 358/1.15 |
| 2005/0168770 A1* | 8/2005 | Kurose | G06F 3/1215 358/1.15 |
| 2006/0061794 A1* | 3/2006 | Ito | G06F 3/1285 358/1.13 |
| 2009/0190173 A1* | 7/2009 | Inada | G06K 15/1856 358/1.15 |

(Continued)

FOREIGN PATENT DOCUMENTS

| JP | 2011067993 A | 4/2011 |
| JP | 2011257972 A | 12/2011 |
| JP | 2015072580 A | 4/2015 |

*Primary Examiner* — Jacky X Zheng
(74) *Attorney, Agent, or Firm* — Buchanan Ingersoll & Rooney PC

(57) ABSTRACT

An information processing apparatus includes a hardware processor that stores intermediate data of a plurality of print jobs in a storage. The hardware processor is configured to perform, read first intermediate data of a first prim job; rasterize the read first intermediate data to generate print data; output the print data to an image forming apparatus; determine whether reading the first intermediate data allows extra, time in relation to a throughput of a print engine; determine whether reading second intermediate data of a second print job is a bottleneck of a printing time; and execute in parallel reading the first intermediate data and reading the second intermediate data, in response to a determination that the operation of reading the first intermediate data allows extra time in relation to the throughput of the print engine and a determination that reading the second intermediate data is a bottleneck of the printing time.

17 Claims, 4 Drawing Sheets

(56) References Cited

U.S. PATENT DOCUMENTS

2012/0026521 A1\* 2/2012 Nogawa .................. G06T 11/60
358/1.13
2013/0088732 A1\* 4/2013 Matsuda .................. H04N 1/46
358/1.9

\* cited by examiner

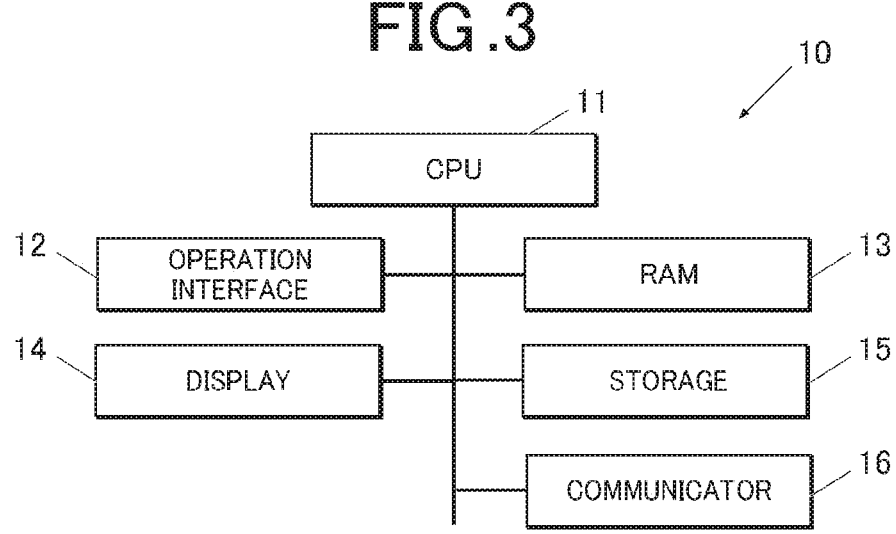
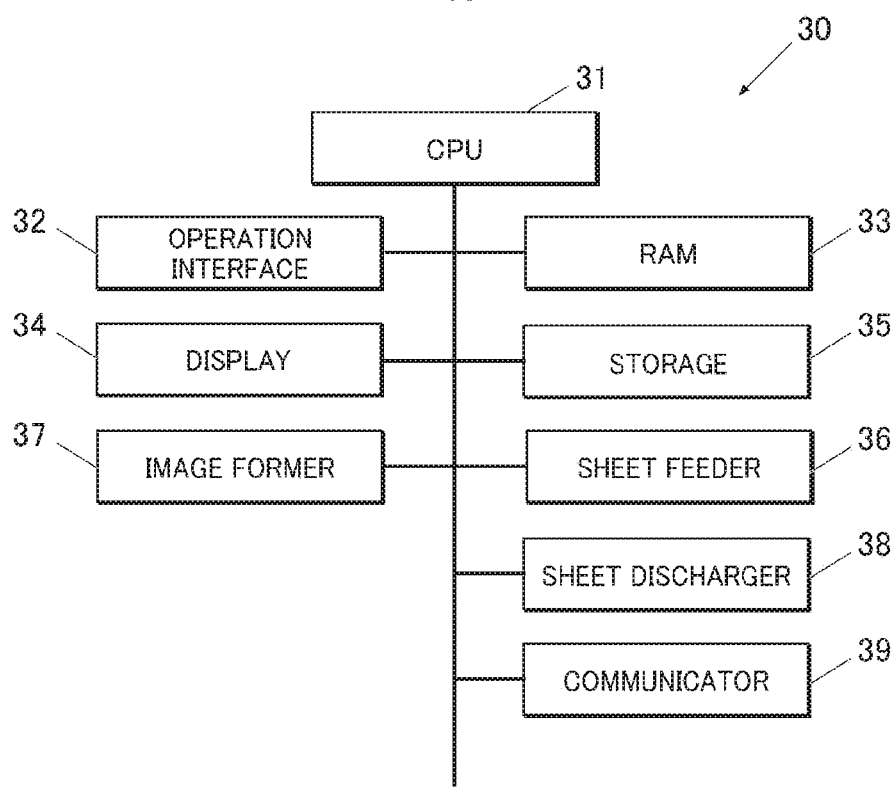

INFORMATION PROCESSING APPARATUS, IMAGE FORMING SYSTEM, PRINT CONTROL METHOD, AND RECORDING MEDIUM

BACKGROUND

Technological Field

The present invention relates to an information processing apparatus, an image forming system, a print control method, and a recording medium.

Description of the Related Art

There is known an image forming apparatus (printing machine), such as a printer, that forms (prints) an image on a sheet serving as a recording medium, using an inkjet recording method or the like. There is also known an image forming system in which a client personal computer (PC) transmits print data to an image forming apparatus such that the image forming apparatus forms an image.

This type of image forming apparatus has only one print engine that serves as a mechanism for actually performing printing. Therefore, the image forming apparatus sequentially processes a print job J1 being printed, and a next print job J2. When printing these print jobs, raster image processor (RIP) processing is performed to convert page description language (PDL) data, which is intermediate data based on document data, into printable print data. Then, the print data is transmitted to the image forming apparatus so as to be printed. RIP processing is processing for converting PDL data into data in a printable format that can be printed by an image forming apparatus. That is, RIP processing is rasterization for converting PDL data into print data of bitmap images. A technique for performing print processing while performing rasterization of the print job J1 has been established for industrial image forming apparatuses.

There is known an image forming apparatus configured to efficiently perform rasterization (see Japanese Patent Application Publication No. 2011-67993 (JP 2011-67993 A)). This image forming apparatus includes an image processor in which a single cache memory is connected to a plurality of raster image processors that work in parallel to convert a single piece of print data into a printable format. Each raster image processor stores a portion of print data to be rasterized and rasterized print data in the cache memory. If print data to be processed includes the same data portion as that included in the print data stored in the cache memory, the raster image processor obtains the rasterized print data from the cache memory without performing rasterization.

There is also known an image forming apparatus configured to effectively use the memory (see Japanese Patent Application Publication No. 2011-257972 (JP 2011-257972 A)). This image forming apparatus includes a CPU having two cores, and a RAM. Each core performs analysis processing for analyzing PDL data to generate display list (DL) data, and rasterization processing for generating print data from the DL data. One of the cores obtains a DL total size and a processed DL total size from an information management table, and suspends analysis processing being performed by that core so as to perform rasterization processing, based, on a predetermined set value and a DL use area size calculated from the DL total size and the processed DL total size.

There are cases where the access speed to the HDD at the time of reading and writing a large amount of PDL data from and to an HDD is a bottleneck in rasterization processing. To address this problem, a known print control apparatus executes printing in parallel with the reading and writing from and to the HDD (see Japanese Patent Application Publication No. 2015-72580 (JP 2015-72580 A)). This print control apparatus compares the reading speed of data from an HDD with the printing speed of a destination printing apparatus. If the reading speed is higher than the printing speed, the print control apparatus allows writing of print data obtained by performing RIP processing on a different print job to the HDD while outputting print image data that has been written in the HDD to the printing apparatus. If the reading speed is lower than the printing speed, the print control apparatus suspends RIP processing, reads print image data from the HDD without performing writing, and supplies the print image data to the printing apparatus.

However, the image forming apparatus of JP 2011-67993 A is configured to process a single print job. There are light print jobs that do not require much time for rasterization, and heavy print jobs that require much time for rasterization. In the case of light print jobs, the print engine speed is a bottleneck, whereas rasterizing processing allows extra time. In the case of heavy print jobs, rasterizing processing is a bottleneck, which prevents taking advantage of the print engine speed. Therefore, there is a demand for efficiently performing printing such a plurality of print jobs.

As for the image forming apparatus of JP 2011-257972 A and the print control apparatus of JP 2015-72580 A, analysis processing and rasterization processing (RIP processing) are suspended. Therefore, there is a demand for more efficiently performing printing without suspending such processing.

SUMMARY

An object of the present invention is to reduce printing time for a plurality of print jobs without suspending the processing.

To achieve at least one of the abovementioned objects, according to an aspect of the present invention, an information processing apparatus reflecting one aspect of the present invention comprises, a hardware processor that stores intermediate data of a plurality of print jobs M a storage; wherein the hardware processor is configured to: read first intermediate data of a first print job of the plurality of print jobs from the storage; rasterize the read first intermediate data to generate print data, and output the print data to an image forming apparatus; determine whether an operation of reading the first intermediate data allows extra time in relation to a throughput of a print engine of the image forming apparatus; determine whether an operation of reading second intermediate data of a second print job following the first print job is a bottleneck of a printing time; and execute in parallel the operation of reading the first intermediate data and the operation of reading the second intermediate data from the storage, in response to a determination that the operation of reading the first intermediate data allows extra, time in relation to the throughput of the print engine of the image forming apparatus and a determination that the operation of reading the second intermediate data is a bottleneck of the printing time.

An image forming system reflecting another aspect of the present invention comprises: the information processing apparatus; and the image forming apparatus.

A print control method reflecting another aspect of the present invention comprises: controlling storing intermediate data of a plurality of print jobs in a storage; wherein the controlling includes: reading first intermediate data of a first print job of the plurality of print jobs from the storage; rasterizing the read first intermediate data to generate print data, and outputting the print data to an image forming apparatus; determining whether an operation of reading the first intermediate data allows extra, time in relation to a throughput of a print engine of the image forming apparatus; determining whether an operation of reading second intermediate data of a second print job following the first print job is a bottleneck of a printing time; and executing in parallel the operation of reading the first intermediate data and the operation of reading the second intermediate data from the storage, in response to a determination that the operation of reading the first intermediate data allows extra time in relation to the throughput of the print engine of the image forming apparatus and a determination that the operation of reading the second intermediate data is a bottleneck of the printing time.

Reflecting another aspect of the present invention, a non-transitory computer-readable storage medium storing a program that causes a hardware processor of a computer to perform a procedure includes: storing intermediate data of a plurality of print jobs in a storage; reading first intermediate data of a first print job of the plurality of print jobs from the storage; rasterizing the read first intermediate data to generate print data, and outputting the print data to an image forming apparatus; determining whether an operation of reading the first intermediate data allows extra time in relation to a throughput of a print engine of the image forming apparatus; determining whether an operation of reading second intermediate data of a second print job following the first print job is a bottleneck of a printing time; and executing in parallel the operation of reading the first intermediate data and the operation of reading the second intermediate data from the storage, in response to a determination that the operation of reading the first intermediate data allows extra time in relation to the throughput of the print engine of the image forming apparatus and a determination that the operation of reading the second intermediate data is a bottleneck of the printing time.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention, and wherein.

FIG. 3 is a block diagram illustrating a main functional configuration of a client PC;

FIG. 4 is a block diagram illustrating a main functional configuration of air image forming apparatus;

DETAILED DESCRIPTION OF EMBODIMENTS

Figure 1:
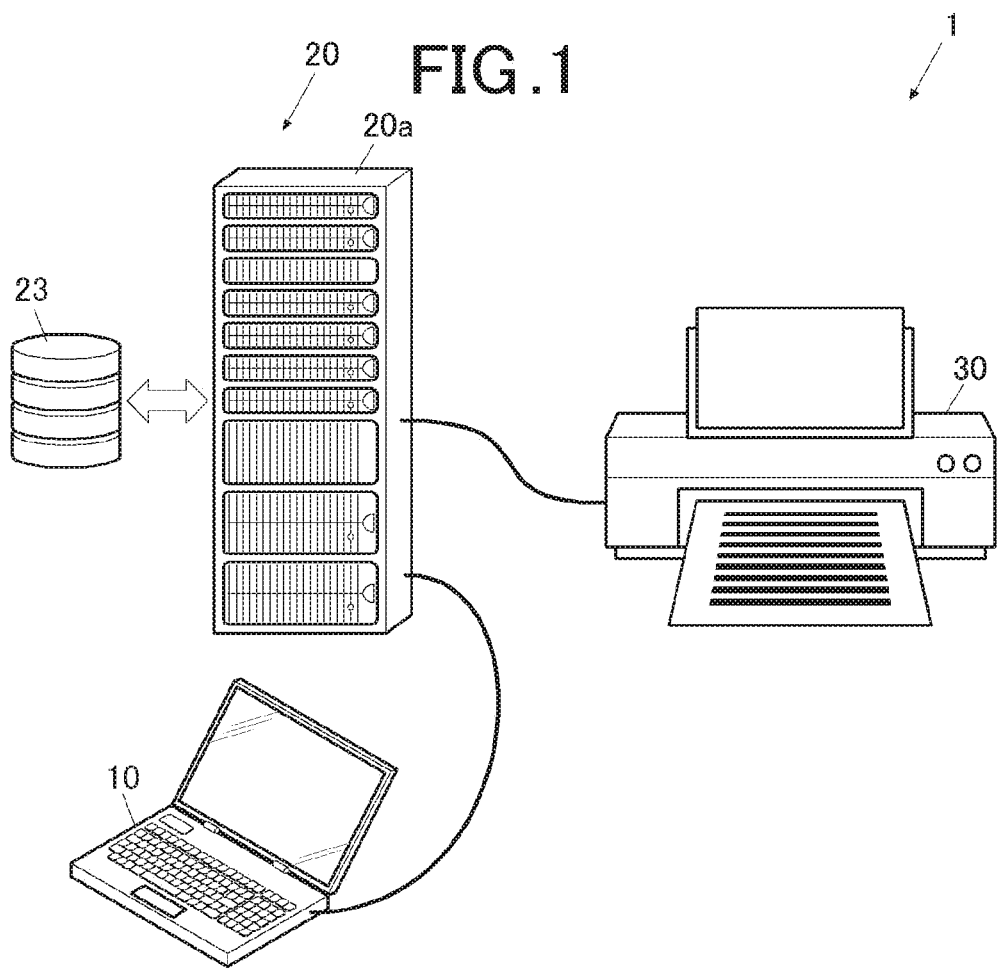
FIG. 1 illustrates a schematic configuration of an image forming system according to an embodiment of the present invention.

Hereinafter, one or more embodiments of the present invention will be described with reference to the drawings. However, the scope of the invention is not limited to tire disclosed embodiments.

An embodiment of the present invention will be described in detail with reference to tire accompanying drawings. However, the present invention is not limited to the examples illustrated in the drawings.

Figure 2:
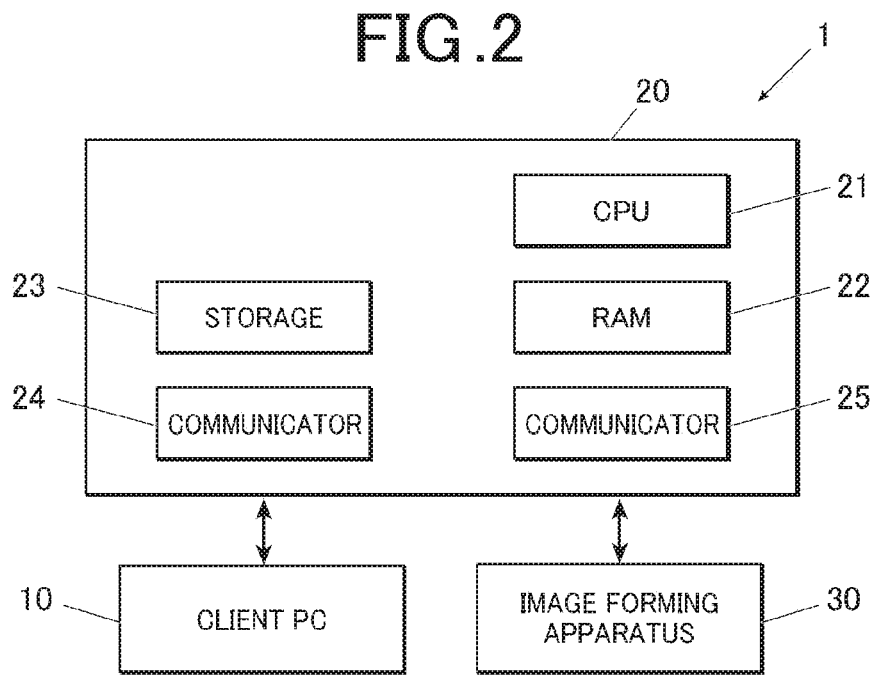
FIG. 2 is a block diagram illustrating a main functional configuration of an image system.

First, the device configuration of an image forming system 1 according to the present embodiment will be described with reference to FIGS. 1 to 4. FIG. 1 is a schematic diagram of the image forming system 1 according to the present embodiment. FIG. 2 is a block diagram illustrating a schematic configuration of the image forming system 1. FIG. 3 is a block diagram illustrating a main functional configuration of a client PC 10. FIG. 4 is a block diagram illustrating a main functional configuration of an image forming apparatus 30.

The image forming system 1 of the present embodiment is a print system that forms and prints an image of PDL data based on document data, on a sheet, in response to an instruction from the user. As illustrated in FIGS. and 2, the image forming system 1 includes the client PC 10, an image processing apparatus 20, and the image forming apparatus 30. The client PC 10 and the image processing apparatus 20 are communicably connected to each other via a communication network such as a local area network (LAN). The image processing apparatus 20 and the image forming apparatus 30 are directly communicably connected to each other over a communication system such as a universal serial bus (USB).

The client PC 10 is used by the user. The client PC 10 is an information processing apparatus that receives a users input such as a print instruction with respect to the image forming apparatus 30, and transmits a print job including document data to be printed, to the image processing apparatus 20. The client PC 10 may be any information processing apparatus (information terminal) such as a desktop PC and a tablet PC.

The image processing apparatus 20 is an information processing apparatus that converts document data of a print job transmitted from the client PC (converts document data into PDL data and rasterizes the PDL data) to obtain print data (image data), and causes the image forming apparatus 30 to print the print data. The image processing apparatus 20 is, for example, a server apparatus having a higher processing capacity than the client PC 10. Note that the image processing apparatus 20 may be any other information processing apparatus such as a PC.

The image processing apparatus 20 includes an image processing apparatus main body 20a and a storage 23. The storage 23 is externally connected to the image processing apparatus main body 20a. The storage 23 is a storage to which data can be written, and from which data can be read. In the present embodiment, PDL data to be stored is huge, and therefore the storage 23 is an HDD that is low in cost per capacity. The storage 23 may be a memory that runs at a higher speed than HDDs, or may be a solid state drive (SSD). Further, the storage 23 may be disposed inside the image processing apparatus main body 20a.

The image forming apparatus 30 is a printing apparatus that forms and prints an image on a sheet based on print data transmitted from the image processing apparatus 20. The image forming apparatus 30 is an industrial color inkjet printer. In the case of industrial printing, the sheet size for printing is large (for example, B2 size), so that the image of PDL data is also huge. Therefore, it takes time to perform rasterization in the image processing apparatus 20. In rasterization, in particular, it takes time to read PDL data loaded in the storage 23. Note that the image forming apparatus 30 is not limited to a color inkjet printer, and may be any image forming apparatus of a different image forming system such as an electrophotographic system, and may be any image forming apparatus of a different apparatus type such as a multifunction peripheral (MFP). Further, the image forming apparatus 30 may be an image forming apparatus that forms a monochrome image.

The image forming apparatus 30 includes only one print engine. Therefore, the image forming apparatus 30 sequentially executes a plurality of print jobs. Print jobs are, for example, in units of files.

In the image forming system 1, the user operates the client PC 10 to transmit a print instruction and a print job. In response to the print job transmitted from the client PC 10, the image processing apparatus 20 rasterizes PDL data of the transmitted print job to generate print data (image data). Upon completion of rasterization, the image processing apparatus 20 transmits the print data to the image forming apparatus 30, so that the image forming apparatus 30 prints the print data. The image processing apparatus 20 continues printing while rasterizing the PDL data of the number of pages of the print job.

As illustrated in FIG. 3, the client PC 10 includes a central processing unit (CPU) 11, an operation interface 12, a random access memory (RAM) 13, a display 14, a storage 15, and a communicator 16. These components of the client PC 10 are connected to each other via a bus.

The CPU 11 reads a specified program from among system programs and application programs stored in the storage 15, loads the program to the RAM 13, and performs various types of processing in accordance with the program loaded in the RAM 13.

The operation interface 12 includes a keyboard having various keys, and a pointing device such as a mouse. The operation interface 12 receives a user's input through the keys and a position input, and outputs the operation information to the CPU 11. The operation interface 12 may include a touch panel disposed on the display screen of the display 14 so as to receive a user's touch input.

The RAM 13 provides a work memory space (work area), and stores temporary data.

The display 14 includes a display panel such as a liquid crystal display (LCD) and an electroluminescence (EL) display. Under the control of the CPU 11, the display 14 displays various types of display information.

The storage 15 includes an HDD and an SSD. The storage 15 is a storage that stores various programs and various types of data in a readable and writable manner.

The communicator 16 is a communication interface such as a network card connected to a communication network. The communicator 16 transmits and receives information to and from apparatuses such as the image processing apparatus 20 on the communication network.

As illustrated in FIG. 2, the image processing apparatus 20 includes a CPU 21 serving as a controller, a RAM 22, the storage 23, and communicators 24 and 25. Note that in FIG. 2, the image processing apparatus main body 20a and the storage 23 are illustrated as an integral unit, and the components of the image processing apparatus 20 are connected to each other.

The CPU 21 reads a specified program from among system programs and application programs stored in the storage 23, loads the program to the RAM 22, and performs various types of processing in accordance with the program loaded in the RAM 22.

The RAM 22 provides a work memory space (work area), and stores temporary data.

The storage 23 includes an HDD and an SSD. The storage 23 is a storage that stores various programs and various types of data in a readable and writable manner. The storage 23 stores especially a print job reading program for executing a print job reading process (described below).

The communicator 24 is a communication interface such as a network card connected to a communication network. The communicator 24 transmits and receives information to and from apparatuses such as the client PC 10 on the communication network.

The communicator 25 is a communication interface connected to the image forming apparatus 30. The communicator 25 transmits and receives information to and from the image forming apparatus 30 through a cable.

Figure 5:
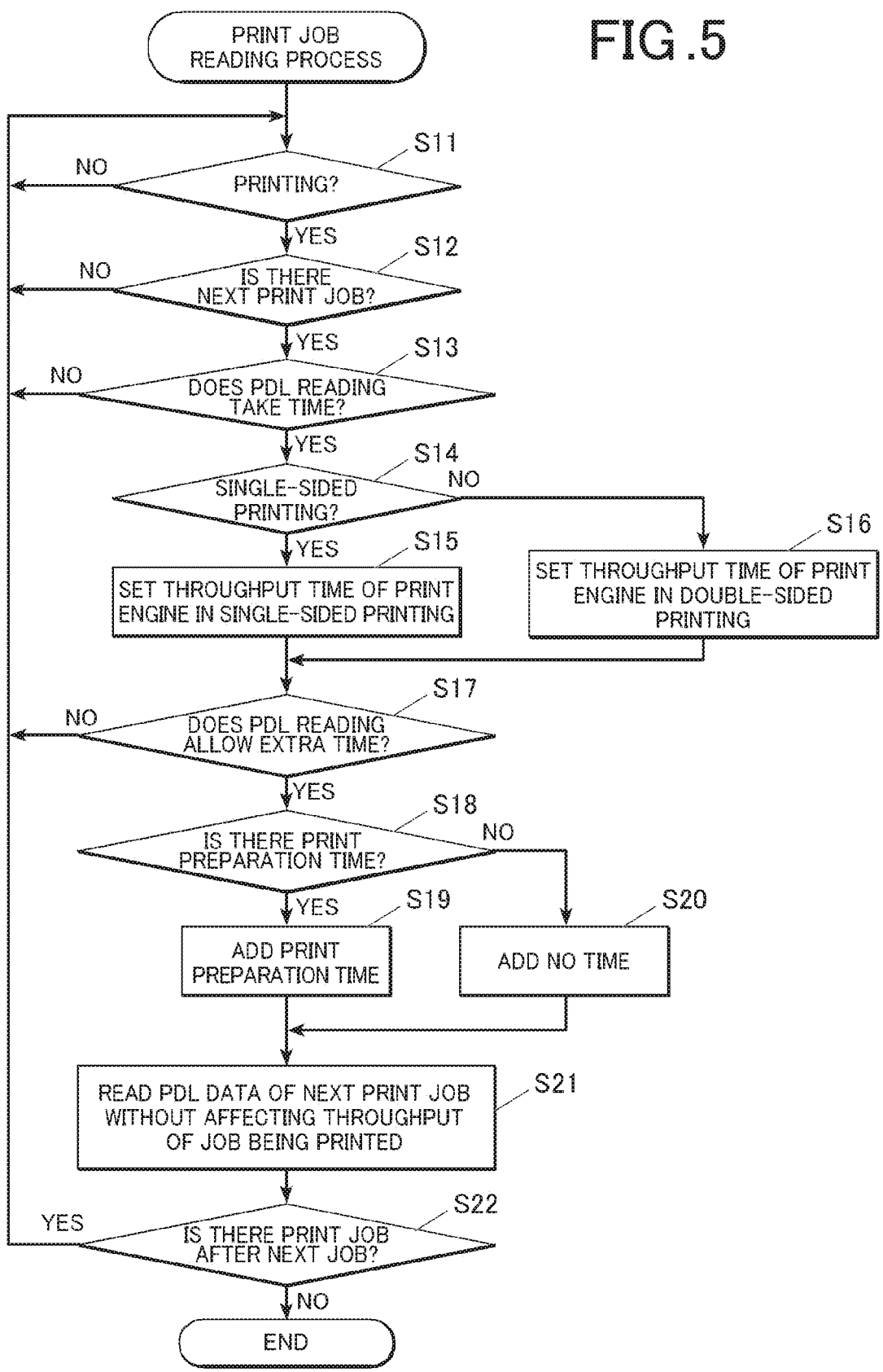
FIG. 5 is a flowchart illustrating a print job reading process.

As illustrated in FIG. 5, the image forming apparatus 30 includes a CPU 31, an operation interface 32, a RAM 33, a display 34, a storage 35, a sheet feeder 36, an image former 37, a sheet discharger 38, and a communicator 39. These components of the image forming apparatus 30 are connected to each other via a bus.

The CPU 31 reads a specified program from among system programs and application programs stored in the storage 35, loads the program to the RAM 33, and performs various types of processing in accordance with the program loaded in the RAM 33.

The operation interface 32 includes various keys. The operation interface 32 receives a user's input for various settings through the keys, and, outputs the operation information to the CPU 31.

The RAM 33 provides a work memory space (work area), and stores temporary data.

The display 34 includes a display panel such as an LCD and an EL display. The display 34 displays various types of display information under the control of the CPU 31.

The storage 35 includes a flash memory. The storage 35 is a storage that stores various programs and various types of data in a readable and writable manner.

The sheet feeder 36 includes a sheet feed tray, a manual feed tray, and a conveyance roller. Under the control of the CPU 31, the sheet feeder 36 picks up a sheet from the sheet feed tray or the manual feed tray, and conveys the sheet to the image former 37.

The image former 37 includes printer heads having nozzle holes for ejecting four colors of ink, cyan (C), magenta (M), yellow (Y), and black (K) of the inkjet recording system, and an ultraviolet (U V) irradiator. The ink used here is UV curable ink. Under the control of the CPU 31, the image former 37 ejects ink droplets of colors C, M, Y, and K from the printer heads onto the sheet conveyed from the sheet feeder 36, based on print data, and causes the UV irradiator to irradiate the ink on the sheet with ultraviolet rays to cure and fix the ink, thereby forming a color image on the sheet.

The sheet discharger 38 includes a sheet discharge tray and a conveyance roller. Under the control of the CPU 31, the sheet discharger 38 conveys the sheet with an image formed by the image former 37 to the sheet discharge tray so as to discharge the sheet. The sheet discharger 38 includes a flipper that turs over a sheet with an image formed on one side thereof by the image former 37 and feeds again the sheet to the image former 37. With this flipper, it is possible to form images on both sides of a sheet.

The communicator 39 is a communication interface connected to the image processing apparatus 20. The communicator 39 transmits and receives information to and from the image processing apparatus 20 through a cable.

In the following, the operation of the image forming system 1 will be described with reference to FIGS. 5 and 6.

FIG. 5 is a flowchart illustrating a print job reading process.
FIG. 6 is a diagram illustrating printing time of print jobs A and B in Comparative Example and Example.

When the client PC 10 receives a user's input through the operation interface 12, the CPU 11 generates a print job including document data (for example, a PDF file or a JPEG file) to be printed, and transmits a print instruction and a print job to the image processing apparatus 20 via the communicator 16.

Then, in the image processing apparatus 20, upon receiving time print job and the print instruction from the client PC 10 via the communicator 24, the CPU 21 converts the document data of the print job into PDL data, and stores the PDL data of the print job in association with the print instruction in the storage 23. In this manner, pieces of PDL data of a plurality of print jobs are stored in the storage 23 in the order of print instructions.

Meanwhile, the CPU 21 sequentially reads the pieces of PDL data of print jobs from the storage 23 in chronological order of print instructions. A unit of reading PDL data of a print job is equal to a unit of performing rasterization. A unit of reading PDL data may be a page of PIN, data, or may be one of a plurality of bands or a plurality of blocks obtained by dividing a page, for example. Then, the CPU 21 performs rasterization (and image processing (for example, conversion from RGB (red, green, blue) data into CMYK data)) of PDL data of a print job read from the storage 23, or PDL data of a print job that is stored in the RAM 22 by a print job reading process (described below), in chronological order of print instructions, thereby generating print data. Then, the CPU 21 causes the communicator 25 to transmit the generated print data to the image forming apparatus 30 so as to print the print data. The CPU 21 performs a series of these printing steps until all the print jobs stored in the storage 23 are printed.

In the image processing apparatus 20, for example, at least one print job and, one print instruction are stored in the storage 23. When reading of PDL data of a print job corresponding to the oldest print instruction is started, the CPU 21 executes a print job reading process in accordance with the print job reading program that is appropriately read from the storage 23 and loaded into the RAM 22.

As illustrated in FIG. 5, the CPU 21 first determines whether PDL data of the read print job is being printed (step S11). If the PDL data of the print job is not being printed (step S11; NO), the procedure repeats step S11.

If the PDL data of the print job is being printed (step S11; YES), the CPU 21 determines whether there is the next print job of the print job being printed (whether the next prim job is stored in the storage 23) (step S12). If there is no next print job (step S12; NO), the procedure returns to step S11.

If there is the next print job (step S12; YES), the CPU 21 determines whether reading of PDL data of the next job of step S12 takes time (step S13). That is, in step S13, the CPU 21 determines whether the reading time of PDL data from the storage 23 in the rasterizing time is a bottleneck of the printing time of the next print job.

One method for obtaining the reading time of the PDL data, of the next print job in step S13 is, for example, to calculate the reading time of the PDL data of the next print job based on the amount of the PDL data of the next print job. This method is based on the fact that the rasterizing time increases in proportion to the volume of the print job. Another method for obtaining the reading time of the PDL data of the next print job is, for example, to calculate the reading time of the PDL data of the next print job based on the number of print objects of the PDL data of the next print job. This method is based on the fact that the rasterizing time increases in proportion to the number of print objects of the print job. The print objects may be text, graphics, pictures, or the like contained in the image of PDL data. Still another method for obtaining the reading time of the PDL data of the next print job is, for example, to calculate the reading time of the PDL data of the next print job based on the size of the PDL data, and the number of print objects of the next print job.

In step S13, the CPU 21 determines whether reading of the PDL data of the next print job takes time, based on whether the calculated reading time of the PDL data of the next print job is greater than or equal to a predetermined threshold. This threshold is a threshold for determining whether the reading time of the PDL data of the next print job is a bottleneck of the rasterizing time, and is set to a value that is, for example, obtained in advance through experiments.

Then, the CPU 21 determines whether the print job being printed in step S11 is single-sided printing (step S14). When the mint job is single-sided printing (step S14; YES), the CPU 21 sets a throughput time corresponding to the throughput of the print engine in single-sided printing in the image forming apparatus 30, in accordance with the print job being printed (step S15). The throughput is the number of output (minted) pages per unit time in the print engine. The throughput time is the output time allowed for each page of a sheet in the print engine. If the print job is double-sided printing (step S14; NO), the CPU 21 sets a throughput time corresponding to the throughput of the print engine in double-sided printing in the image forming apparatus 30, in accordance with the print job being printed (step S16). The throughput time of double-sided printing is twice as long as the throughput time of single-sided printing.

Then, the CPU 21 determines whether reading (rasterization) of the PDL data of the print job being printed in step S11 allows extra time in relation to the throughput of the print engine of the image forming apparatus 30 obtained in step S15 or S16 (step S17). In step S17, for example, the CPU 21 samples the time of access to the storage 15 for the print job being printed in a predetermined time T (for example, 50 [msec]), and calculates, as the HDD occupancy ratio (the occupancy ratio of data access to the storage 23), the ratio of the access time to the storage 23 for the print job being printed to the maximum time accessible to the storage 23 per time T. The maximum time accessible to the storage 15 is, for example, the access time corresponding to the maximum communication speed [bit/s] for accessing the storage 23 from the CPU 21. The HDD occupancy is information reflecting the throughput of the print engine of the image forming apparatus 30.

The relationship between the HDD occupancy, the throughput of the print engine, and the rasterizing time varies depending on the performance of the image forming apparatus 30 and the performance of the image processing apparatus 20. Therefore, an upper limit value is set in advance. That is, in step S17, the CPU 21 determines whether the rasterization of the PDL data of the print job being printed allows extra time in relation to the throughput of the prim engine, based on whether the HDD occupancy is less than or equal to the set upper limit value.

If reading of the PDL data of the print job being printed does not allow extra time (step S17; NO), the procedure returns to step S11. If reading of the PDL data of the print job being printed allows extra time (step S17; YES), the CPU 21 obtains the status of the image forming apparatus 30 via the communicator 25. The CPU 21 calculates the print preparation time of the image forming apparatus 30 corresponding to the obtained status, and determines whether there is a print preparation time (step S18). The status of the image forming apparatus 30 may be obtained at regular intervals.

The print preparation time to be taken to be ready for printing is calculated if the status of the image forming apparatus 30 is, for example, any of the following states: the temperature of the printer head of the image former 37 is high in the case where the image former 37 includes a drum, the temperature of the drum is being adjusted; UV irradiation by the UV irradiator of the image former 37 is in preparation; and sheet conveyance by the sheet feeder 36 or the sheet discharger 38 is in preparation.

If there is a print preparation time (step S18; YES), the CPU 21 adds the calculated print preparation time to the print engine throughput time that is set in step S15 or S16 (step S19). If there is no print preparation time (step S18; NO), the CPU 21 adds no time to the print engine throughput time that is set in step S15 or S16 (step S20). The throughput time of the print engine for the print job being printed that is obtained in step S19 or S20 is taken into account as extra time allowed for rasterization of the print job being printed.

Then, the CPU 21 reads PDL data of the next print job from the storage 23 and holds the PDL data in the RAM 22 without affecting the throughput (throughput time) of the print engine for the print job being printed obtained in step S19 or S20 (step S21). In step S21, the CPU 21 reads the PDL data of the next print job in advance and holds the read PDL data in the RAM 22, in a manner such that the HDD occupancy ratio calculated in step S17 becomes the highest possible value while being less than or equal to the upper limit value, and in the range where the reading time of the PDL data of the print job being printed and, the reading time of the PDL data of the next job do not exceed the throughput time of the print job being printed which is set in step S15 or S16 and to which the print preparation time is added in step S19 or not added in step S20. Accordingly, when printing the next print job, it is possible to perform printing using the PDL data of the next print job held in the RAM 22, and complete printing quickly. Moreover, since the throughput of the print engine for the print job being printed is not affected, the printing time of the print job being printed remains unchanged.

Then, the CPU 21 determines whether there is a print job after the next print job of the print job being primed (step S22). If there is a prim job after the next print job (step S22; YES), the procedure returns to step S11. In step S11, the CPU 21 determines whether the next print job is being printed. If there is no print job after the next prim job (step S22; NO), the print job reading process ends.

Figure 6:
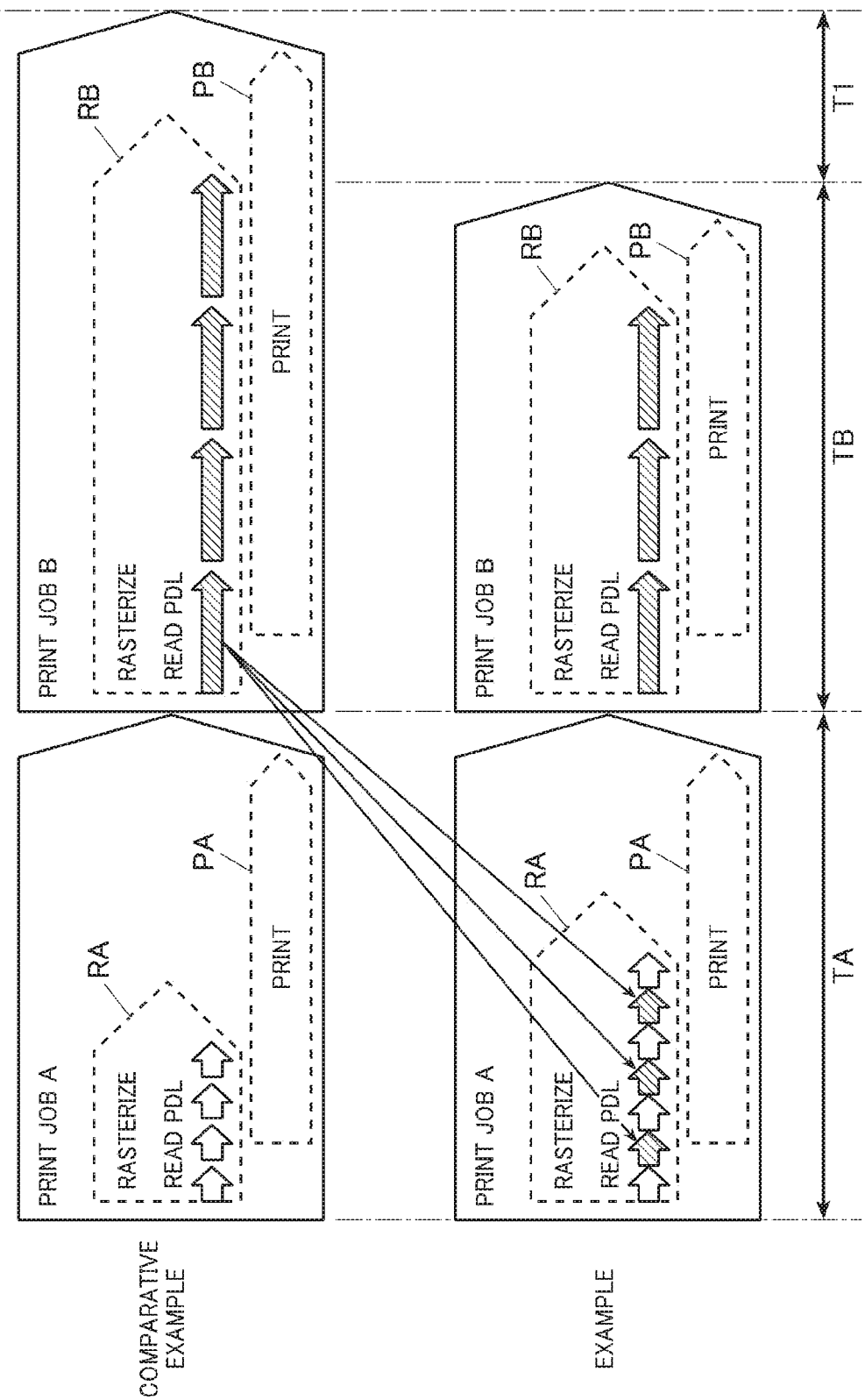
FIG. 6 is a diagram illustrating print time of print jobs in Comparative Example and Example.

FIG. 6 illustrates Comparative Example as a related-art example in which a related-art print job reading process is performed, and Example in which the print job reading process of FIG. 5 is performed, in the case of sequentially printing a print job A and a print job B in the image forming system 1. The print job A is such a print job that the throughput of the print engine in the printing time is a bottleneck. The print job B is such a print job that reading of PDL data in the printing time is a bottleneck.

In the print job A in Comparative Example, only the PDL data of the print job A is read and rasterized in a rasterizing time RA. However, in the print job A, the rasterization allows extra time in relation to the throughput of the print engine. Therefore, even if the PDL data of the print job B is read in advance, the throughput of the print engine is not affected as long as this reading operation is within a predetermined time. Meanwhile, in the print job A in Example, the PDL data of the print job A and the PDL data of the print job B are read and rasterized in parallel (sequentially and alternately) in units of reading during a rasterizing time RA. The actual printing time PA of the print job B in the image forming apparatus 30 is the same between Comparative Example and Example. The actual printing time is the time taken by the image forming apparatus 30 to perform printing, and corresponds to the time obtained by multiplying the throughput time by the number of sheets. Accordingly, the printing time TA of the print job A is the same between Comparative Example and Example. The printing time is the time taken by the image processing apparatus 20 and the image forming apparatus 30 to perform printing.

Whereas, in the print job B in Comparative Example, all the PDL data of the print job B is read and rasterized in a rasterizing time RB. Each arrow in the rasterizing time RB corresponds to, for example, one page of the PDL data of the print job B. In the print job B in Example, an unread portion of the PDL data of the print job B is read and rasterized in the rasterizing time RB. In Comparative Example, the reading of the PDL data in the rasterizing time RB is a bottleneck in the print job B. Meanwhile, in Example, the reading of the PDL data of the print job B can be performed in the printing time TA (rasterizing time RA). Each arrow corresponding to the print job A in the rasterizing time RA in Example corresponds to, for example, one page of the PDL data of the print job B. Each arrow corresponding to the print job B in the rasterizing time RA in Example corresponds to, for example, one of three bands obtained by dividing one page of the PDL data of the print job B. In this manner, the unit amount of reading the PDL data of the print job A is greater than the unit amount of reading the PDL data of the print job B. In Example, in step S21 of the print job reading process, the PDL data of the job B is read in the range where the reading time of the PDL data of the jobs A and B (rasterizing time RA) does not exceed the actual printing time PA corresponding to the throughput time calculated in step S19 or S20, with the process start time taken into account.

As a result, the rasterizing time RB is shorter in Example than in Comparative Example. Accordingly, an actual printing time PB of the print job B corresponding to the throughput time of the print engine of the image thrilling apparatus 30 is shorter in Example than in Comparative Example. Therefore, the printing time TB of the print job B is shorter by a time T1 in Example than in Comparative Example.

As described above, according to the present embodiment, the image processing apparatus 20 includes the CPU 21 that stores PDL data of a plurality of print jobs in the storage 23. The CPU 21 reads first PDL data of a first print job (a print job being printed) of the plurality of print jobs from the storage 23, rasterizes the read first PDL data to generate print data, and outputs the print data to the image forming apparatus 30. The CPU 21 determines whether reading of the first PDL data allows extra time in relation to a throughput of a print engine of the image forming apparatus 30, and determines whether reading of second PDL data of a second print job (next print job) following the first print job is a bottleneck of a printing time. The CPU 21 executes in parallel the reading of the first PDL data and the reading of the second PDL data from the storage 23, in response to a determination that the reading of the first PDL data allows extra time in relation to the throughput of the print engine of the image forming apparatus 30 and a determination, that the reading of the second PDL data is a bottleneck of the printing time.

With this configuration, the second PDL data is read from the storage 23 and held in the RAM 22 so as to be used for later printing, without suspending the processing of the first print job. This reduces the printing time of the second print job, and hence reduces the printing time of the plurality of print jobs.

The second print job is the next print job of the first print job. Therefore, the printing time of the plurality of print jobs is effectively reduced.

The CPU 21 is configured such that, when executing in parallel the reading of the first PDL data and the reading of the second PDL data, the unit amount of the operation of reading the first PDL data is greater than the unit amount of the operation of reading the second PDL data. This makes it possible to efficiently read the second PDL data from the storage 23, without interrupting the reading of the first PDL data.

The unit amount of reading the PDL data is a page, or a band or a block obtained by dividing the page. This makes it possible to efficiently read the PDL data.

The CPU 21 determines whether the reading of the first PDL data allows extra, time in relation to the throughput of the print engine of the image forming apparatus 30, by determining whether the occupancy ratio of the access time to the storage 23 for the first print job is less than or equal to a predetermined upper limit value. Accordingly, it is possible to read the second PDL data in advance, while reliably preventing the printing time of the first PDL data from being extended.

The CPU 21 reads the second PDL data from the storage 23 such that the occupancy ratio of the access time to the storage 23 for the first print job becomes the highest possible value while being less than or equal to the upper limit value. Accordingly, it is possible to read a greater portion of the second PDL data in advance, while reliably preventing the printing time of the first PDL data from being extended.

The CPU 21 determines whether the reading of the second PDL data is a bottleneck of the printing time, by calculating a reading time of the second PDL data based on at least either one of the amount of the second PDL data and the number of print objects of the second PDL data and determining whether the calculated reading time of the second PDL data is greater than or equal to a predetermined threshold. Accordingly, the second PDL data is read in the case where the printing time of the second print job can be reduced. This makes it possible to prevent unnecessary reading of the second PDL data, and reduce the processing load.

The CPU 21 reads the second PDL data from the storage 23, without affecting the throughput time of the print engine for the first print job. Accordingly, the second PDL data is read in the case where the priming time of the second print job can be reduced with certainty.

The CPU 21 reads the second PDL data from the storage 23, in a range where the reading time of the first PDL data and the reading time of the second PDL data do not exceed the throughput time of the first prim job. Accordingly, it is possible to read the second PDL data in advance, while reliably preventing the printing time of the first PDL data from being extended.

The CPU 21 uses, as the throughput time, the throughput time of the print engine in single-sided printing or double-sided printing of the first print job. Accordingly, it is possible to read the second PDL data in advance in accordance with the printing mode, which may be single-sided printing or double-sided printing, while more reliably preventing the printing time of the first PDL data from being extended.

The CPU 21 adds the print preparation time of the image forming apparatus 30 to the throughput time of the prim engine for the first print job, and reads the second PDL data from the storage 23 without affecting the throughput time of the print engine for the first print job with the print preparation time added. Accordingly, it is possible to read the second PDL data in advance in accordance with the throughput time with the print preparation time added, while more reliably preventing the printing time of the first PDL data from being extended.

The image forming system 1 includes the image processing apparatus 20 and the image forming apparatus 30. With this configuration, in the image forming system 1, the second PDL data is read from the storage 23 and held so as to be used for later printing, without suspending the processing of the first print job. This reduces the printing time of the second print job, and hence reduces the printing time of the plurality of print jobs.

Note that the above embodiment and modifications are merely examples of the information processing apparatus, the image forming system, the print control method, and the program according to a preferred embodiment of the present invention, and the present invention is not limited thereto.

For example, in the present embodiment, in the print job reading process, while printing the print job, the PDL data of the next print job of the print job being printed is read and stored in the RAM 22. However, the present invention is not limited thereto. As in the print job reading process in the above embodiment, while printing the print job, the CPU 21 may read the PDL data of a print job following the print job being printed (a, print job following the next print job).

For example, the CPU 21 determines whether reading of third PDL data of a third print job following the second print job (a print job after the next print job) is a bottleneck of the printing time, in response to a determination that the reading the second PDL data of the second print job (the next job) is not a bottle neck of the printing time. The CPU 21 executes in parallel the reading of the first PDL data and the reading of the third PDL data from the storage 23, in response to a determination that the reading of the first PDL data allows extra time in relation to the throughput of the print engine of the image forming apparatus 30 and a determination that the operation of reading the third PDL data is a bottleneck of the printing time. Accordingly, the third PDL data is read from the storage 23 and held so as to be used for later printing, without suspending the processing of the first print job. This reduces the printing time of the third print job, and hence reduces the printing time of the plurality of print jobs.

Further, in the above embodiment, the image forming system 1 includes a single image forming apparatus 30. However, the present invention is not limited thereto. For example, the image forming system 1 may be configured such that a plurality of image forming apparatuses 30 are connected to the image processing apparatus 20 such that a single print job is printed by the plurality of image forming apparatuses 30. For example, assume an image forming system in which the image processing apparatus 20 is connected to one image forming apparatus 30a that prints with a first color (for example, C, M, Y, and K) on a sheet, and another image forming apparatus 30b that prints with a second color (for example, white) different from the first color, such that the image forming apparatuses 30a and 30b together print each job with C, M, Y, K, and white, on a sheet, in this system, there is no duster for holding sheets between the image forming apparatus 30a and the image forming apparatus 30b. Further, the image forming apparatus 30b has a print engine having a lower processing capacity than a print engine of the image forming apparatus 30a.

The engine throughput time of the image forming apparatuses 30a and 30b is obtained by adding the throughput time of the image forming apparatus 30a and the throughput time of the image forming apparatus 30h together. However, in the print job reading process, the CPU 21 executes operations in the respective steps and drives the image forming apparatuses 30a and 30b while setting the throughput time of the image forming apparatus 30a to be equal to the throughput time of the image forming apparatus 30b.

In this manner, when a plurality of image forming apparatuses (image forming apparatuses 30a and 30b) are provided, the CPU 21 sets the throughput time of the print engine of each of the image forming apparatuses 30a and 30b to be equal to the throughput time of the print engine of the image forming apparatus 30b having the lowest processing capacity. This makes it possible to reduce the printing time of the plurality of print jobs without suspending the processing, and efficiently print each job without suspending one of the image forming apparatuses 30a and 30h.

Further, the image forming system 1 may include the client PC 10, and the image forming apparatus 30 including the functional units of the image processing apparatus 20.

The detailed configuration and detailed operation of the components of the image forming system 1 of the above embodiment may be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2019-116059 filed on Jun. 24, 2019 is incorporated herein by reference in its entirety

What is claimed is:

1. An information processing apparatus comprising:
a hardware processor that stores intermediate data of a plurality of print jobs in a storage;
wherein the hardware processor is configured to:
read first intermediate data of a first print job of the plurality of print jobs from the storage;
rasterize the read first intermediate data to generate print data, and output the print data to an image forming apparatus;
determine whether an operation of reading the first intermediate data allows extra time in relation to a throughput of a print engine of the image forming apparatus;
determine whether an operation of reading second intermediate data of a second print job following the first print job is a bottleneck of a printing time; and
execute in parallel the operation of reading the first intermediate data and the operation of reading the second intermediate data from the storage, in response to a determination that the operation of reading the first intermediate data allows extra time in relation to the throughput of the print engine of the image forming apparatus and a determination that the operation of reading the second intermediate data is a bottleneck of the printing time.

2. The information processing apparatus according to claim 1,
wherein the hardware processor is configured to:
determine whether an operation of reading third intermediate data of a third print job following the second print job is a bottleneck of a printing time, in response to a determination that the operation of reading the second intermediate data is not a bottle neck of the printing time; and
execute in parallel the operation of reading the first intermediate data and the operation of reading the third intermediate data from the storage, in response to a determination that the operation of reading the first intermediate data allows extra time in relation to the throughput of the print engine of the image forming apparatus and a determination that the operation of reading the third intermediate data is a bottleneck of the printing time.

3. The information processing apparatus according to claim 2, wherein the third print job is a next print job of the second print job.

4. The information processing apparatus according to claim 1, wherein the second print job is a next print job of the first print job.

5. The information processing apparatus according to claim 1, wherein the hardware processor is configured such that, when executing in parallel the operation of reading the first intermediate data and the operation of reading the second intermediate data, a nit amount of the operation of reading the first intermediate data is greater than a unit amount of the operation of reading the second intermediate data.

6. The information processing apparatus according to claim 5, wherein the unit amount of the operation of reading is a page, or a band or a block obtained by dividing the page.

7. The information processing apparatus according to claim 1, wherein the hardware processor is configured to determine whether the operation of reading the first intermediate data allows extra time in relation to the throughput of the print engine of the image forming apparatus, by determining whether an occupancy ratio of an access time to the storage for the first print job is less than or equal to a predetermined upper limit value.

8. The information processing apparatus according to claim 7, wherein the hardware processor is configured to read the second intermediate data from the storage such that the occupancy ratio of the access time to the storage for the first print job becomes a highest possible value while being less than or equal to the upper limit value.

9. The information processing apparatus according to claim 1, wherein the hardware processor is configured to determine whether the operation of reading the second intermediate data is a bottleneck of the printing time, by calculating a reading time of the second intermediate data based on at least either one of an amount of the second intermediate data and a number of print objects of the second intermediate data and determining whether the calculated reading time of the second, intermediate data is greater than or equal to a predetermined threshold.

10. The information processing apparatus according to claim 1, wherein the hardware processor is configured to read the second intermediate data from the storage, without affecting a throughput time of the print engine for the first print job.

11. The information processing apparatus according to claim 10, wherein the hardware processor is configured to read the second intermediate data from the storage, in a range where a reading time of the first intermediate data and a reading time of the second intermediate data do not exceed the throughput time of the first print job.

12. The information processing apparatus according to claim 11, wherein the hardware processor is configured to use, as the throughput time, a throughput time of the print engine in single-sided printing or double-sided printing of the first print job.

13. The information processing apparatus according to claim 10, wherein the hardware processor is configured to add a print preparation time of the image forming apparatus to the throughput time of the print engine for the first print job, and read the second intermediate data from the storage without affecting the throughput time of the print engine for the first print job with the print preparation time added.

14. The information processing apparatus according to claim 1, wherein the hardware processor is configured to, when the image forming apparatus is provided in plurality, set a throughput time of a print engine of each of the plurality of image forming apparatuses to be equal to the throughput time of the print engine having a lowest processing capacity.

15. An image forming system comprising:
the information processing apparatus of claim 1; and
the image forming apparatus.

16. A print control method comprising:
controlling storing intermediate data of a plurality of print jobs in a storage;
wherein the controlling includes:
reading first intermediate data of a first print job of the plurality of print jobs from the storage;
rasterizing the read first intermediate data to generate pant data, and outputting the print data to an image forming apparatus;
determining whether an operation of reading the first intermediate data allows extra time in relation to a throughput of a print engine of the image forming apparatus;
determining whether an operation of reading second intermediate data of a second print job following the first print job is a bottleneck of a printing time; and
executing in parallel the operation of reading the first intermediate data and the operation of reading the second intermediate data from the storage, in response to a determination that the operation of reading the first intermediate data allows extra time in relation to the throughput of the print engine of the image forming apparatus and a determination that the operation of reading the second intermediate data is a bottleneck of the printing time.

17. A non-transitory computer-readable storage medium storing a program that causes a hardware processor of a computer to perform a procedure comprising:
storing intermediate data of a plurality of print jobs in a storage;
reading first intermediate data of a first print job of the plurality of print jobs from the storage;
rasterizing the read first intermediate data to generate print data, and outputting the print data to an image forming apparatus;
determining whether air operation of reading the first intermediate data allows extra time in relation to a throughput of a print engine of the image forming apparatus;
determining whether an operation of reading second intermediate data of a second print job following the first print job is a bottleneck of a printing time; and
executing in parallel the operation of reading the first intermediate data and the operation of reading the second intermediate data from the storage, in response to a determination that the operation of reading the first intermediate data allows extra time in relation to the throughput of the print engine of the image forming apparatus and a determination that the operation of reading the second intermediate data is a bottleneck of the printing time.

* * * * *